United States Patent
Nakajima

(10) Patent No.: US 11,673,598 B2
(45) Date of Patent: Jun. 13, 2023

(54) STEERING MODULE

(71) Applicant: Toyota Jidosha Kabushiki Kaisha, Toyota Aichi-ken (JP)

(72) Inventor: Takayuki Nakajima, Aichi-ken (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 278 days.

(21) Appl. No.: 16/828,183

(22) Filed: Mar. 24, 2020

(65) Prior Publication Data

US 2020/0353971 A1 Nov. 12, 2020

(30) Foreign Application Priority Data

May 9, 2019 (JP) .............................. JP2019-089311

(51) Int. Cl.
| | | |
|---|---|---|
| *B62D 1/16* | (2006.01) | |
| *B62D 1/04* | (2006.01) | |
| *B60H 1/00* | (2006.01) | |
| *B60R 11/02* | (2006.01) | |
| *B60R 11/00* | (2006.01) | |

(52) U.S. Cl.
CPC ........... *B62D 1/16* (2013.01); *B60H 1/00292* (2013.01); *B60H 1/00564* (2013.01); *B60R 11/0229* (2013.01); *B62D 1/04* (2013.01); *B60R 2011/0085* (2013.01)

(58) Field of Classification Search
CPC .............. B60H 1/00292; B60H 1/0055; B60H 1/00564; B62D 1/04; B62D 1/16; B60R 11/0229; B60R 11/0247; B60R 11/0264; B60R 2011/0005; B60R 2011/0008; B60R 2011/0082; B60R 2011/0085; B60K 37/00; B60K 37/02; B60K 37/04; B60K 35/00; B60K 2370/828
See application file for complete search history.

(56) References Cited

U.S. PATENT DOCUMENTS

| | | | | |
|---|---|---|---|---|
| 4,562,957 A | * | 1/1986 | Nakagawa ........... | B60H 1/2225 219/202 |
| 4,655,308 A | * | 4/1987 | Kraus .................. | B60Q 1/1461 74/552 |
| 4,679,730 A | * | 7/1987 | Uchida ................ | B60H 1/2225 237/12.3 A |
| 5,070,323 A | * | 12/1991 | Iino ........................ | B60Q 3/68 340/980 |
| 5,088,571 A | * | 2/1992 | Burry .................. | B60H 1/0055 296/70 |

(Continued)

FOREIGN PATENT DOCUMENTS

| | | |
|---|---|---|
| JP | S48-033886 Y1 | 10/1973 |
| JP | S56-075030 U | 6/1981 |

(Continued)

*Primary Examiner* — Laura Freedman
(74) *Attorney, Agent, or Firm* — Dinsmore & Shohl LLP

(57) ABSTRACT

A steering module includes a steering wheel which is provided in front of a driver seat, a column cover which is provided on a vehicle front side of the steering wheel, extends in a forward and rearward direction of a vehicle, and has a functional component mounting region in at least one of an inner inside and an upper portion thereof, and a meter member which is formed integrally with the column cover and includes a main display portion disposed at a position spaced apart from the column cover.

17 Claims, 5 Drawing Sheets

(56) References Cited

U.S. PATENT DOCUMENTS

| | | | | |
|---|---|---|---|---|
| 5,204,667 | A * | 4/1993 | Inoue | G01D 7/06 |
| | | | | 340/980 |
| 5,418,836 | A * | 5/1995 | Yazaki | H04M 1/6083 |
| | | | | 379/446 |
| 5,660,244 | A * | 8/1997 | Matsuda | B60K 11/04 |
| | | | | 180/69.21 |
| 6,007,420 | A * | 12/1999 | Harm | B60H 1/00292 |
| | | | | 454/140 |
| 6,129,406 | A * | 10/2000 | Dauvergne | B60K 37/00 |
| | | | | 296/70 |
| 6,322,122 | B2 * | 11/2001 | Burns | B60K 37/00 |
| | | | | 296/70 |
| 6,371,551 | B1 * | 4/2002 | Hedderly | B60K 37/00 |
| | | | | 296/192 |
| 6,447,041 | B1 * | 9/2002 | Vandersluis | B62D 25/142 |
| | | | | 296/72 |
| 6,499,550 | B2 * | 12/2002 | Matsuda | B60K 37/00 |
| | | | | 296/72 |
| 6,709,041 | B1 * | 3/2004 | Hotary | B60N 2/36 |
| | | | | 296/70 |
| 7,180,020 | B2 * | 2/2007 | Onoda | B62D 1/16 |
| | | | | 200/61.54 |
| 7,198,393 | B2 * | 4/2007 | Tubidis | B60K 35/00 |
| | | | | 313/511 |
| 7,407,190 | B2 * | 8/2008 | Berg | B62D 1/195 |
| | | | | 280/775 |
| 7,498,930 | B2 * | 3/2009 | Phillips | B60R 11/02 |
| | | | | 701/32.7 |
| 8,233,046 | B2 * | 7/2012 | Ohue | B60R 11/04 |
| | | | | 348/148 |
| 8,538,628 | B2 * | 9/2013 | Backman | B60K 37/06 |
| | | | | 701/36 |
| 8,724,858 | B2 * | 5/2014 | Kawakubo | A61B 3/14 |
| | | | | 382/117 |
| 8,888,133 | B2 * | 11/2014 | Tsuchihashi | A01D 34/662 |
| | | | | 74/552 |
| 9,573,627 | B2 * | 2/2017 | Sanjo | B60K 37/04 |
| 10,222,613 | B2 * | 3/2019 | Kawamoto | B62D 1/181 |
| 10,353,199 | B2 * | 7/2019 | Takamatsu | B60K 37/00 |
| 10,464,480 | B2 * | 11/2019 | Yamada | B60K 37/00 |
| 10,732,412 | B2 * | 8/2020 | Ogasawara | G06F 3/013 |
| 11,115,577 | B2 * | 9/2021 | Takai | B60R 16/023 |
| 2007/0106822 | A1 | 5/2007 | Phillips et al. | |
| 2012/0227535 | A1 * | 9/2012 | Backman | B60K 37/06 |
| | | | | 74/552 |
| 2015/0197135 | A1 * | 7/2015 | Chen | F25B 21/02 |
| | | | | 62/3.61 |
| 2016/0132126 | A1 * | 5/2016 | Van Laack | G06V 20/597 |
| | | | | 345/156 |
| 2017/0098425 | A1 * | 4/2017 | Takamatsu | B60K 37/00 |
| 2018/0208210 | A1 * | 7/2018 | Chapman | B60K 37/06 |
| 2019/0077263 | A1 * | 3/2019 | Pegorier | B60K 37/02 |
| 2019/0143815 | A1 * | 5/2019 | Sato | B60K 35/00 |
| | | | | 340/439 |
| 2020/0062191 | A1 * | 2/2020 | Ragner | H04B 1/3877 |
| 2020/0130578 | A1 * | 4/2020 | Murakami | G06V 40/193 |
| 2021/0354529 | A1 * | 11/2021 | Oh | B60H 1/22 |
| 2022/0063410 | A1 * | 3/2022 | Sakata | B60K 37/02 |
| 2022/0169094 | A1 * | 6/2022 | Harris | B62D 1/16 |

FOREIGN PATENT DOCUMENTS

| | | | |
|---|---|---|---|
| JP | 2003-146223 A | 5/2003 | |
| JP | 2010-100261 A | 5/2010 | |
| JP | 2017149425 A * | 8/2017 | B60K 35/00 |
| WO | 03047943 A1 | 6/2003 | |

* cited by examiner

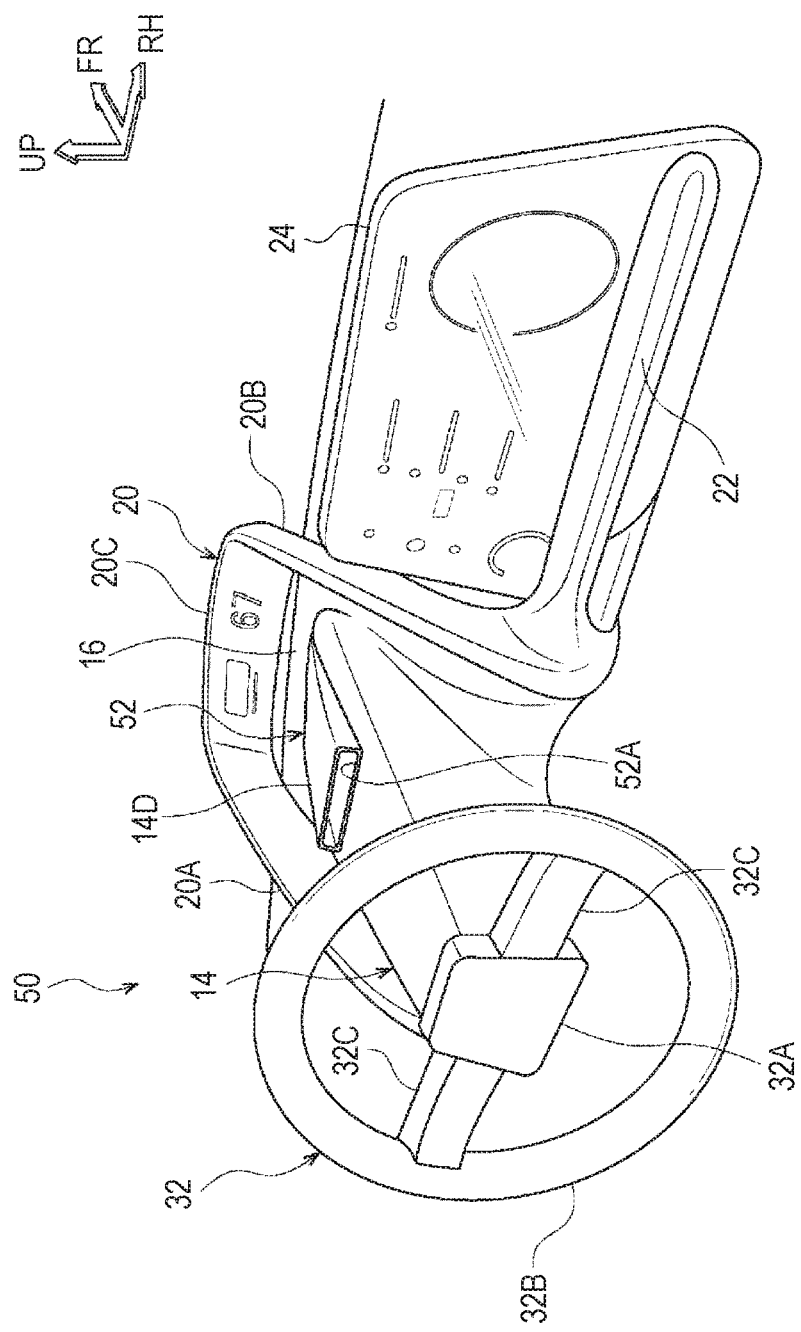

STEERING MODULE

CROSS-REFERENCE TO RELATED APPLICATIONS

This application claims priority to Japanese Patent Application No. 2019-089311 filed on May 9, 2019, which is incorporated herein by reference in its entirety including the specification, drawings and abstract.

BACKGROUND

1. Technical Field

The present disclosure relates to a steering module.

2. Description of Related Art

Japanese Patent Application Publication No. 2003-146223 (JP 2003-146223 A) discloses a steering column module in which a column cover and a meter are modularized.

SUMMARY

In the structure disclosed in JP 2003-146223 A, work efficiency at the time of a vehicle assembly can be improved by modularizing the column cover and the meter, as compared with a structure in which the meter is mounted on an instrument panel or the like. On the other hand, since functional components such as a meter cannot be easily changed, there is room for improvement in terms of customizing a cockpit according to a user's request.

In view of the above facts, an object of the present disclosure is to provide a steering module which is able to customize a cockpit while ensuring work efficiency at the time of vehicle assembly.

A steering module according to the first aspect includes a steering wheel which is provided in front of a driver seat, a column cover which is provided on a vehicle front side of the steering wheel, extends in a forward and rearward direction of a vehicle, and has a functional component mounting region in at least one of an inner inside and an upper portion thereof, and a meter member which is formed integrally with the column cover and includes a main display portion disposed at a position spaced apart from the column cover.

In the steering module according to the first aspect, the column cover is provided on the vehicle front side of the steering wheel, and the column cover extends in the forward and rearward direction of the vehicle. Here, the column cover has the functional component mounting region in at least one of the inner side and the upper portion. Accordingly, functional components can be mounted on the column cover, and a cockpit can be customized according to a user request.

Further, the meter member is formed integrally with the column cover. Thus, work efficiency at the time of assembly can be improved as compared with a structure in which the meter member is independently mounted on the instrument panel. Furthermore, since the main display portion is disposed at a position spaced apart from the column cover, even when the meter member is integrally formed with the column cover, a user does not feel uncomfortable. Here, functional components broadly include components having functions such as a display device for displaying information, peripheral components of the air conditioner, an agent capable of interacting with the user, and a sensor.

In the steering module according to the second aspect, in the first aspect, a display device which is movable between an unfolded state in which a display surface is exposed and a stored state in which the display surface is hidden may be mounted in the functional component mounting region, and the main display portion of the meter member may be disposed on an upper side of the vehicle and a front side of the vehicle with respect to the display surface in the unfolded state of the display device.

In the steering module according to the second aspect, it is possible for the occupant who is driving to obtain information without greatly moving a line of sight directed forward from the vehicle by the information being displayed on the display surface of the display device mounted in the functional component mounting region. Further, since the display device is configured to be movable between the unfolded state and the stored state, the display device can be stored when not in use.

Furthermore, the main display portion of the meter member is disposed on the upper side of the vehicle and the front side of the vehicle with respect to the display surface in the unfolded state of the display device. Accordingly, even when the display device is unfolded, the occupant can see the information displayed on the main display portion.

In the steering module according to the third aspect, in the first or second aspect, the functional component mounting region may be a duct which is provided inside the column cover and of which one end portion is connected to an air conditioner, and a register to which the other end portion of the duct is connected may be provided in the steering wheel.

In the steering module according to the third aspect, the duct is provided inside the column cover, and the register is provided in the steering wheel. Accordingly, air of which a temperature is adjusted by an air conditioner can be blown from the steering wheel toward an occupant. Moreover, it is not necessary to provide an additional register in the instrument panel.

In the steering module according to the fourth aspect, in any one of the first to third aspect, the meter member may include a pair of right and left support portions which extend from both ends of the column cover in a width direction of the vehicle to a front side of the vehicle and an upper side of the vehicle, and the main display portion may connect upper end portions of the support portions to each other in the width direction of the vehicle.

In the steering module according to the fourth aspect, the meter member is formed so that the column cover straddles the pair of right and left support portions and the main display portion. Accordingly, it can be differentiated from a general design in which a meter or the like is mounted on the instrument panel.

In the steering module according to the fifth aspect, in the fourth aspect, a center display mounting portion on which a center display is mounted may extend from one support portion in the width direction of the vehicle, and the center display mounting portion may be formed integrally with the support portion.

In the steering module according to the fifth aspect, the center display mounting portion is included and modulated. Accordingly, it is not necessary to prepare a component for mounting the center display separately from the column cover.

As described above, according to the steering module according to the first aspect, a cockpit can be customized while work efficiency at the time of a vehicle assembly is ensured.

According to the steering module according to the second aspect, comfort can be improved without impairing the design.

According to the steering module according to the third aspect, a design of the instrument panel can be improved.

According to the steering module according to the fourth aspect, a design of the cockpit can be improved.

According to the steering module according to the fifth aspect, the work efficiency at the time of vehicle assembly can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a perspective view showing a main part of a front portion of a vehicle to which a steering module according to a fourth embodiment is applied.

DETAILED DESCRIPTION OF EMBODIMENTS

First Embodiment

Hereinafter, a steering module 10 according to a first embodiment will be described with reference to the drawings. In addition, an arrow FR appropriately shown in each of the drawings indicates a forward direction with respect to a vehicle, an arrow UP indicates an upward direction with respect to the vehicle, and an arrow RH indicates a rightward direction with respect to the vehicle. Hereinafter, unless otherwise specified, forward and rearward, right and left, and vertical directions mentioned in the description indicate forward and rearward in the forward and rearward direction of the vehicle, right and left in a width direction of the vehicle, and upward and downward in the vertical direction of the vehicle.

Figure 1:
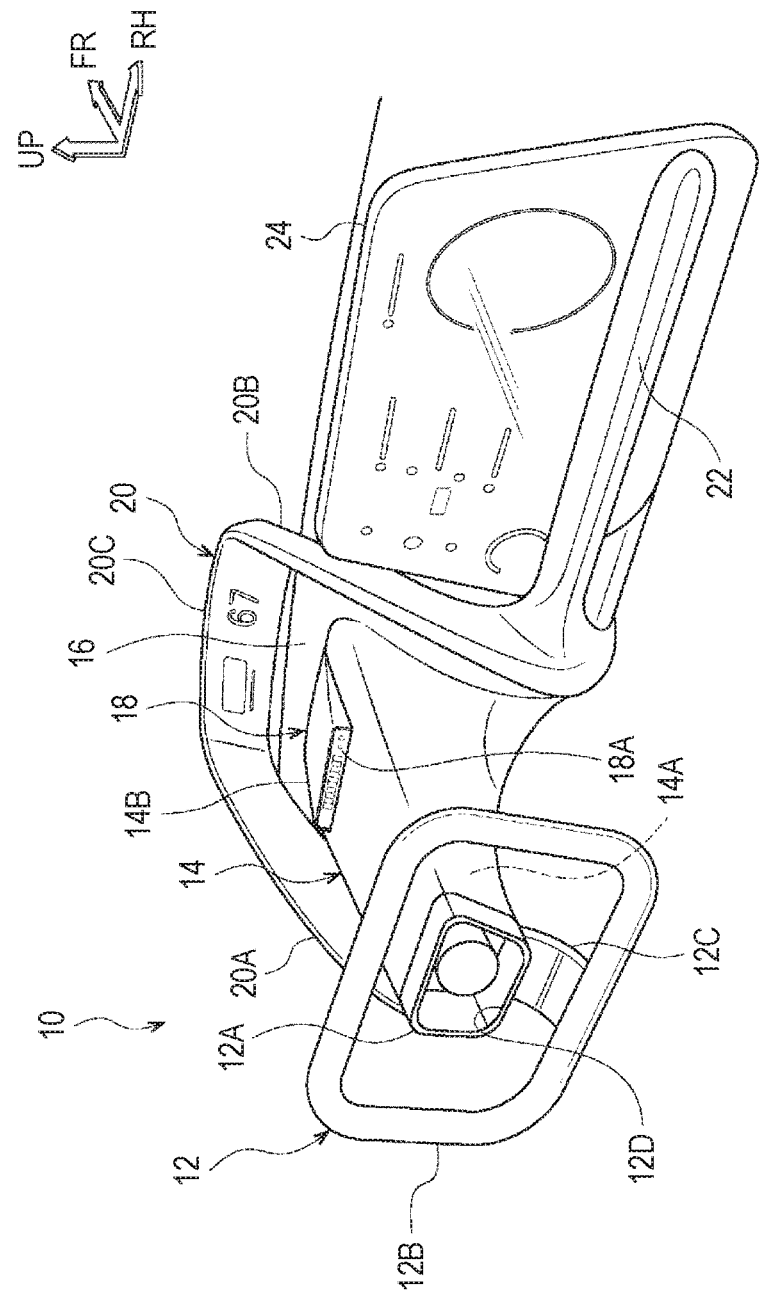
FIG. 1 is a perspective view showing a main part of a front portion of a vehicle to which a steering module according to a first embodiment is applied.

As shown in FIG. 1, a steering module 10 according to the embodiment includes a steering wheel 12. The steering wheel 12 of the embodiment is provided in front of a driver seat and is a so-called deformed steering wheel of which an external shape is substantially rectangular so that the width direction of the vehicle is a longitudinal direction when seen in the forward and rearward direction of the vehicle. In the embodiment, since the left side of the vehicle is the driver seat, the steering wheel 12 is disposed in front of a left seat of the vehicle.

The steering wheel 12 includes a hub portion 12A located at the center, an annular rim portion 12B disposed around the hub portion 12A, and a spoke portion 12C which connects the hub portion 12A to the rim portion 12B. Further, the spoke portion 12C extends downward from a lower portion of the hub portion 12A and is connected to a lower portion of the rim portion 12B in an initial state before the steering wheel 12 is rotated.

Figure 2:
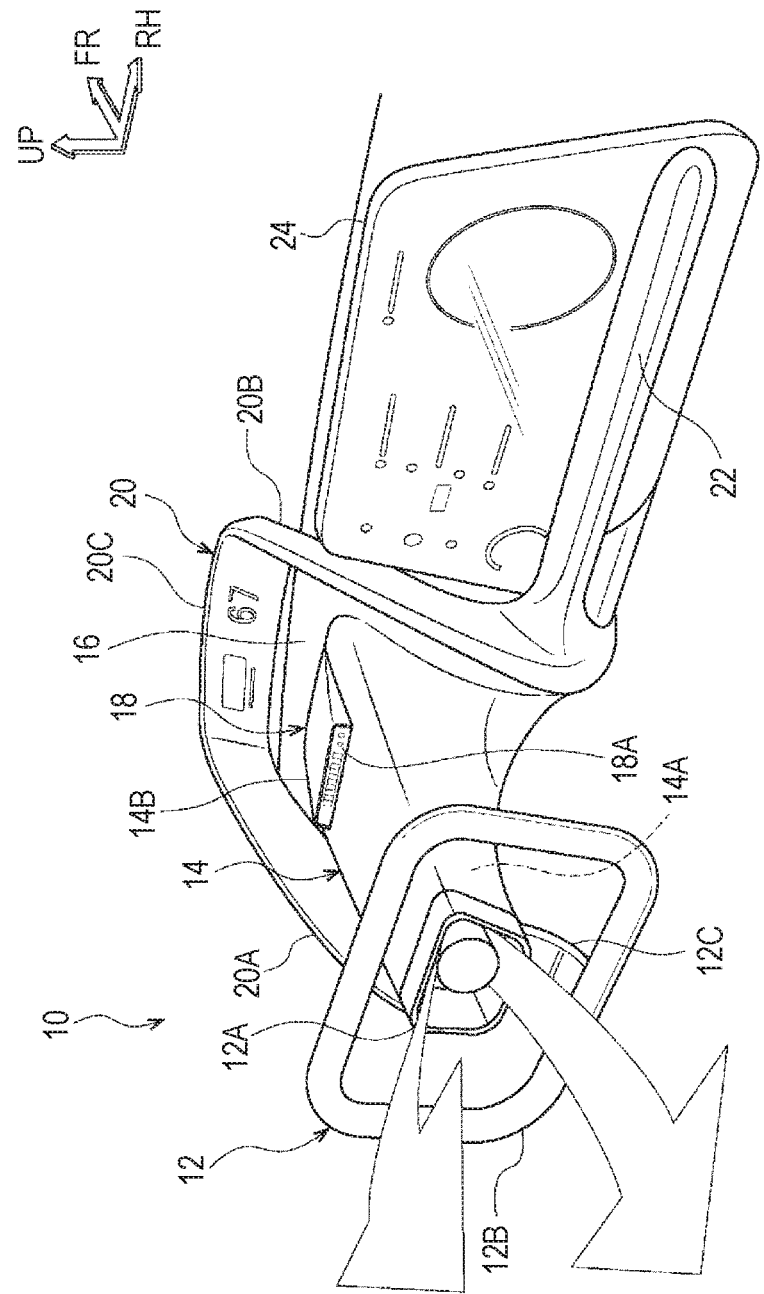
FIG. 2 is a perspective view showing a state in which air is blown from a register.

Here, a register 12D which is a blowhole is formed in the hub portion 12A of the steering wheel 12. Additionally, as shown in FIG. 2, the register 12D is configured so that air can be blown toward an occupant from the register 12D.

As shown in FIG. 1, a column cover 14 is provided on the vehicle front side of the steering wheel 12. The column cover 14 extends in the forward and rearward direction of the vehicle and has a shape in which the vehicle front side is wider than the vehicle rear side. Further, the steering wheel 12 is mounted on a rear end portion of the column cover 14, and a front end portion of the column cover 14 is mounted on an instrument panel 16.

Here, the inside of the column cover 14 is a functional component mounting region, and a duct 14A is provided inside the column cover 14. Then, one end portion of the duct 14A is connected to an air conditioner (not shown) disposed inside the instrument panel 16. Also, the other end portion of the duct 14A is connected to the register 12D formed in the hub portion 12A of the steering wheel 12. Therefore, air of which a temperature is adjusted by the air conditioner is blown from the register 12D through the duct 14A.

Further, a display mounting portion 14B is provided as the functional component mounting region on an upper portion of the column cover 14. The display mounting portion 14B is provided on an upper surface of the front end portion of the column cover 14, and a pop-up display 18 is mounted on the display mounting portion 14B as a display device.

The pop-up display 18 is formed in a substantially rectangular shape in a plan view and includes a display surface 18A. The display surface 18A is provided on a rear end surface of the pop-up display 18 and faces the driver seat. Additionally, information such as a driving mode of the vehicle and an indicator for warning are displayed on the display surface 18A.

A front end portion of the pop-up display 18 is pivotally supported inside the column cover 14 to be rotatable. On the other hand, a rear end portion of the pop-up display 18 having the display surface 18A is a free end. Additionally, the pop-up display 18 is configured to be able to rotate upward and downward around a front end side by a drive mechanism (not shown), and a state shown in FIG. 1 is an unfolded state in which the pop-up display 18 is rotated upward. The pop-up display 18 is not rotated upward from the state shown in FIG. 1, and the display surface 18A is exposed to the driver seat side in the unfolded state.

On the other hand, when the pop-up display 18 is rotated downward from the state of FIG. 1, the display surface 18A is hidden inside the column cover 14. Additionally, in a stored state in which the display surface 18A is hidden, an upper surface of the pop-up display 18 and an upper surface of the column cover 14 have the same height. That is, the pop-up display 18 constitutes a part of the upper surface of the column cover 14.

A meter member 20 is formed integrally with the column cover 14, and the meter member 20 includes a pair of right and left support portions (a support portion 20A and a support portion 20B) and a main display portion 20C. The support portion 20A is formed in a substantially elongated shape and extends from an end portion of the column cover 14 on the left side of the vehicle to the front side of the vehicle and the upper side of the vehicle. Further, like the support portion 20A, the support portion 20B is formed in an elongated shape and extends from an end portion of the column cover 14 on the right side of the vehicle to the front side of the vehicle and the upper side of the vehicle. Additionally, the support portion 20A and the support portion 20B are disposed to face each other in the width direction of the vehicle.

An upper end portion of the support portion 20A and an upper end portion of the support portion 20B are disposed on the upper side of the vehicle and the front side of the vehicle with respect to the column cover 14, and the upper end portions are connected to each other in the width direction of the vehicle by the main display portion 20C. Accordingly, the meter member 20 is provided to straddle the column cover 14, and the main display portion 20C is disposed at a position spaced apart from the column cover 14.

The main display portion 20C extends in the width direction of the vehicle with the forward and rearward direction of the vehicle as a plate thickness direction, and a surface of the main display portion 20C which faces the driver seat is the display surface. Additionally, information such as a speed of the vehicle is displayed on the display surface.

Further, the main display portion 20C is located on the upper side of the vehicle with respect to the pop-up display 18. That is, even when the display surface 18A of the pop-up display 18 in the unfolded state is exposed, the main display portion 20C is disposed not to be hidden by the display surface 18A. Furthermore, the main display portion 20C is located on the front side of the vehicle with respect to the display surface 18A of the pop-up display 18.

A center display mounting portion 22 extends from a lower end portion of the support portion 20B toward the right side (a center portion side in the width direction of the vehicle) of the vehicle. The center display mounting portion 22 is a portion having a substantially elongated shape in which the width direction of the vehicle is the longitudinal direction and is formed integrally with the support portion 20B. Additionally, a center display 24 is mounted on the center display mounting portion 22.

The center display 24 is disposed between the driver seat and a passenger seat and is configured to display a variety of information. Further, switches (not shown) are provided at the center display mounting portion 22. Examples of the switches include a hazard lamp switch and a defroster switch.

Operation

Next, an operation of the embodiment will be described.

In the steering module 10 according to the embodiment, the column cover 14 is provided on the vehicle front side of the steering wheel 12, and the column cover 14 extends in the forward and rearward direction of the vehicle. In this way, it is possible to focus more on driving by the column cover 14 extending in the forward and rearward direction of the vehicle, as compared with a general structure in which the column cover extends obliquely upward toward the occupant.

Here, the display mounting portion 14B is provided at the upper portion of the column cover 14, and the pop-up display 18 is mounted on the display mounting portion 14B. Moreover, the duct 14A is provided inside the column cover 14. Accordingly, functional components such as the pop-up display 18 and the duct 14A can be mounted on the column cover 14, and a cockpit can be customized according to a user's request.

Further, in the embodiment, the meter member 20 is formed integrally with the column cover 14. Thus, work efficiency at the time of assembly can be improved as compared with a structure in which the meter member 20 is independently mounted on the instrument panel 16.

Further, in the embodiment, since the main display portion of the meter member 20 is disposed at a position spaced apart from the column cover 14, even when the meter member 20 is formed integrally with the column cover 14, a user does not feel uncomfortable. As a result, the cockpit can be customized while the work efficiency at the time of the vehicle assembly is ensured.

Further, it is possible for the occupant who is driving to obtain information without greatly moving his/her line of sight by the information being displayed on the display surface 18A of the pop-up display 18 as in the embodiment. In particular, in the embodiment, since the pop-up display 18 which can be moved between the unfolded state and the stored state is use, the pop-up display 18 can be stored when not in use. That is, comfort can be improved without impairing design.

Further, in the embodiment, the main display portion 20C of the meter member 20 is disposed on the upper side of the vehicle and the front side of the vehicle with respect to the display surface 18A in the expanded state of the pop-up display 18. Accordingly, even when the pop-up display 18 is unfolded, the occupant can see information displayed on the main display portion 20C.

Further, in the embodiment, since the register 12D is provided in the steering wheel 12, air can be blown from the steering wheel 12 toward the occupant through the duct 14A inside the column cover 14. In addition, since it is not necessary to provide an additional register in the instrument panel 16, a design of the cockpit can be improved.

Further, in the embodiment, the meter member 20 is formed so that the column cover 14 straddles the support portion 20A, the support portion 20B, and the main display portion 20C. Thus, it can be differentiated from a general design in which a meter or the like is mounted on the instrument panel 16. That is, a design of the instrument panel 16 can be improved.

Further, in the steering module 10 according to the embodiment, the center display mounting portion 22 is included and modularized. Accordingly, it is not necessary to prepare a component for mounting the center display 24 separately from the column cover 14. That is, the work efficiency at the time of assembly to the vehicle can be improved.

Further, in the embodiment, a deformed steering wheel that has a substantially rectangular shape in which the width direction of the vehicle is the longitudinal direction when seen in the forward and rearward direction of the vehicle is adopted as the steering wheel 12. Accordingly, as compared with a structure using a perfect circle-shaped steering wheel, a field of view on the front side of the vehicle as seen from the driver seat is widened. As a result, the display surface of the main display portion 20C can be enlarged. Also, a degree of freedom of arrangement of the main display portion 20C can be improved.

Second embodiment

Next, a second embodiment of the present disclosure will be described with reference to FIG. 3. In addition, the same reference numerals are given to the structures similar to those in the first embodiment, and description thereof will be suitably omitted.

Figure 3:
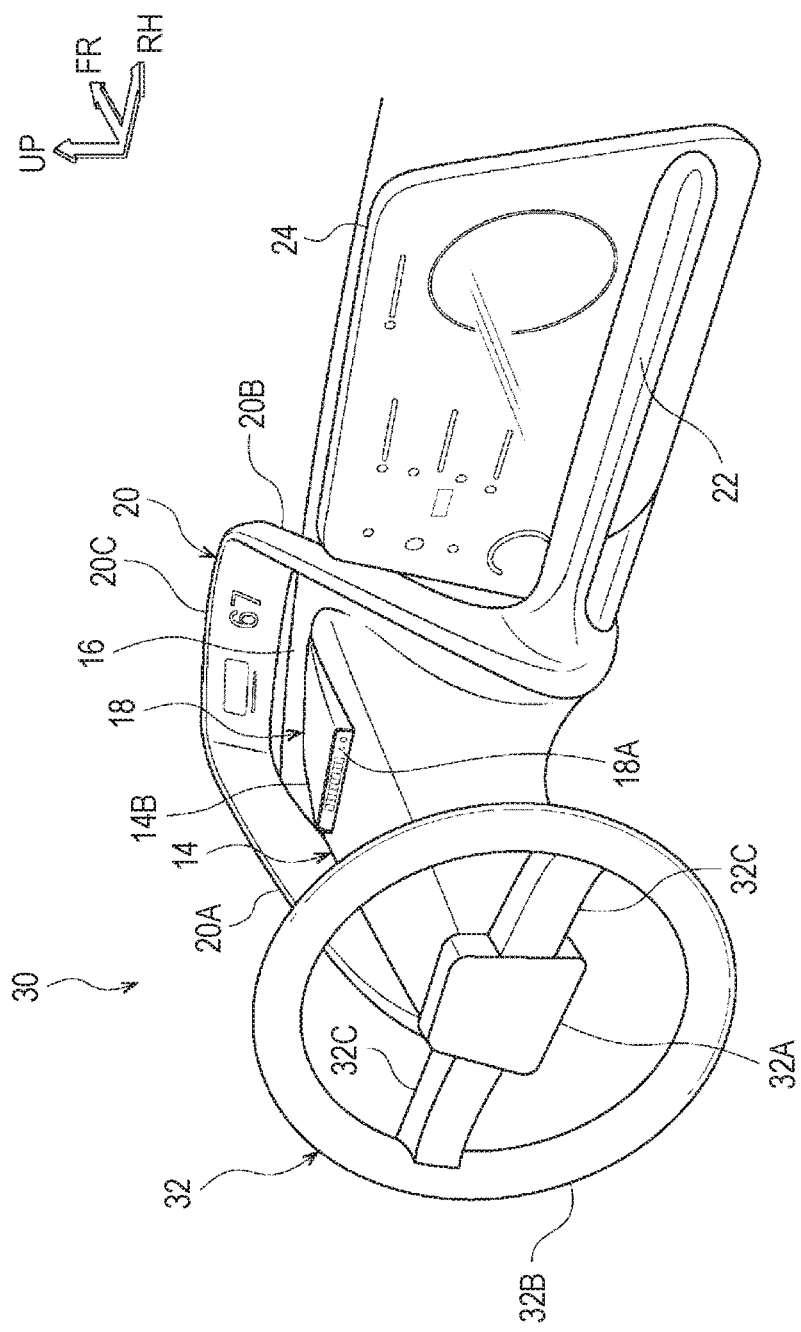
FIG. 3 is a perspective view showing a main part of a front portion of a vehicle to which a steering module according to a second embodiment is applied.

As shown in FIG. 3, in a steering module 30 of the embodiment, a steering wheel 32 is provided instead of the steering wheel 12.

The steering wheel 32 includes a hub portion 32A located at the center, an annular rim portion 32B disposed around the hub portion 32A, and a pair of right and left spoke portions 32C which connect the hub portion 32A to the rim portion 32B.

One spoke portion 32C extends from a right end portion of the hub portion 32A to the right side of the vehicle in an initial state before the steering wheel 32 is rotated, and is connected to a right end portion of the rim portion 32B. The other spoke portion 32C extends from a left end portion of the hub portion 32A to the left side of the vehicle in the initial state before the steering wheel 32 is rotated, and is connected to a left end portion of the rim portion 32B.

In the embodiment, no register is formed in the steering wheel 32, and no duct is formed inside the column cover 14. Further, a display mounting portion 14B is provided on an upper portion of the column cover 14, and a pop-up display 18 is mounted on the display mounting portion 14B.

Operation

Next, an operation of the embodiment will be described.

Even in the structure including the annular steering wheel 32 as in the steering module 30 of the embodiment, the cockpit can be customized while the work efficiency at the time of the vehicle assembly is ensured. In addition, a region inside the column cover 14 used as a duct in the first embodiment can be utilized for another use. Other operations are the same as in the first embodiment.

Third Embodiment

Next, a third embodiment of the present disclosure will be described with reference to FIG. 4. In addition, the same reference numerals are given to the structures similar to those in the first embodiment, and description thereof will be suitably omitted.

Figure 4:
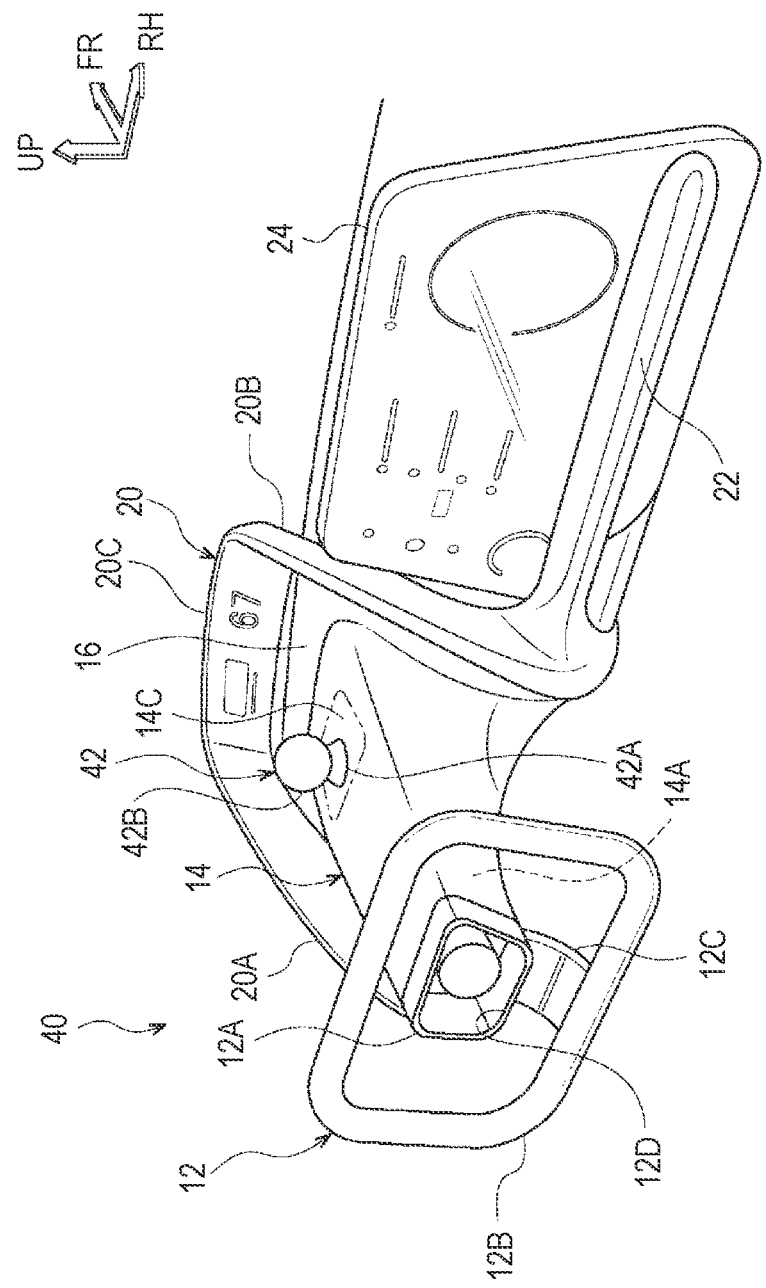
FIG. 4 is a perspective view showing a main part of a front portion of a vehicle to which a steering module according to a third embodiment is applied.

As shown in FIG. 4, in a steering module 40 of the embodiment, an agent 42 is mounted instead of the pop-up display 18.

Specifically, an agent mounting portion 14C is provided on an upper portion of the column cover 14 as a functional component mounting region. The agent mounting portion 14C is provided on an upper surface of a front end portion of the column cover 14, and an agent 42 is mounted on the agent mounting portion 14C.

The agent 42 includes a support portion 42A and a main body portion 42B, and the support portion 42A is mounted on the upper surface of the column cover 14. Further, a wire harness (not shown) extends from the support portion 42A to the inside of the column cover 14 and is connected to a power source such as a battery. Then, electric power is supplied to the agent 42 via the wire harness.

The main body portion 42B is supported on the support portion 42A, and is formed in a substantially spherical shape as an example in the embodiment. Further, a microphone (not shown) is mounted in the main body portion 42B, and thus a sound uttered by the user can be collected through the microphone. Furthermore, a speaker (not shown) is mounted in the main body portion 42B, and thus a sound can be output to the user through the speaker.

Moreover, a light source such as a light emitting diode (LED) is provided inside the main body portion 42B, and thus light can be emitted in a predetermined color according to the collected sound. The light is emitted with an amount of light which does not hinder driving. In addition, the main body portion 42B includes a central processing unit (CPU), a read only memory (ROM), a random access memory (RAM), a storage, and a communication interface.

Additionally, the agent 42 activates or deactivates each function of the vehicle through interaction with the user. For example, a set temperature of an air conditioner is changed on the basis of the sound uttered by the user. The agent 42 also plays music, sets a destination in a navigation system, and notifies of obstacles, and so on.

Operation

Next, an operation of the embodiment will be described.

In the steering module 40 of the embodiment, the agent 42 provides various services to the user. Thus, the number of switches disposed in the cockpit can be reduced, and design thereof can be improved.

Further, the working efficiency at the time of assembly can be improved by modularizing the column cover 14 and the agent 42, as compared with a structure in which the agent 42 is provided independently on the instrument panel 16. Other operations are the same as in the first embodiment.

Fourth Embodiment

Next, a fourth embodiment of the present disclosure will be described with reference to FIG. 5. In addition, the same reference numerals are given to the structures similar to those in the first embodiment, and description thereof will be suitably omitted.

As shown in FIG. 5, in a steering module 50 of the embodiment, a steering wheel 32 is provided instead of the steering wheel 12. Further, a blower unit 52 is mounted instead of the pop-up display 18.

The steering wheel 32 includes a hub portion 32A located at the center, an annular rim portion 32B disposed around the hub portion 32A, and a pair of right and left spoke portions 32C which connect the hub portion 32A to the rim portion 32B. Additionally, no register is formed in the steering wheel 32.

On the other hand, a blower unit mounting portion 14D is provided as a functional component mounting region on an upper portion of the column cover 14. The blower unit mounting portion 14D is provided on an upper surface of a front end portion of the column cover 14, and the blower unit 52 is mounted on the blower unit mounting portion 14D.

The blower unit 52 is formed integrally with the column cover 14 and is formed in a substantially rectangular shape in a plan view. Further, the blower unit 52 is formed so that a height thereof gradually increases from the front side of the vehicle toward the rear side of the vehicle.

Here, a blowhole 52A is formed in a rear end surface of the blower unit 52. The blowhole 52A opens toward the driver seat and is configured to be able to blow air from the blowhole 52A toward the occupant. Also, a duct (not shown) is formed inside the column cover 14, and air from an air conditioner is supplied to the blower unit 52 through the duct. Additionally, the air from the air conditioner is blown toward the occupant from the blowhole 52A.

Operation

Next, an operation of the embodiment will be described.

In the steering module 50 of the embodiment, even when the register is not provided in the steering wheel 32, the air can be blown from the blowhole 52A of the blower unit 52 to the occupant.

Further, as compared with a structure in which the blower unit 52 is independently provided on the instrument panel 16, the work efficiency at the time of assembly can be improved. Other operations are the same as in the first embodiment.

Although the steering module according to the first to fourth embodiments has been described above, it is needless to say that the present disclosure can be implemented in various modes without departing from the gist of the present disclosure. For example, as shown in FIGS. 1 to 3, in the first embodiment and the second embodiment, the structure in which the pop-up display 18 is mounted as the display device has been described, but the present disclosure is not limited thereto. That is, a display which does not pop up as a display device may be mounted on the column cover. Further, a structure in which a combiner for displaying an image projected from a head-up display (HUD) device is mounted as a display device in the column cover may be adopted. Furthermore, a structure in which a HUD device is mounted on the column cover and an image is projected from the HUD device onto a front windshield may be adopted. In this case, augmented reality (AR) display may be performed using a HUD device.

Further, although the meter member 20 is provided to straddle the column cover 14 in the embodiment, the present disclosure is not limited thereto. For example, the meter member 20 may be configured with the support portion 20B and the main display portion 20C without providing the support portion 20A. In this case, a space can be secured on the vehicle left side of the column cover 14.

Further, although the center display mounting portion 22 is formed integrally with the support portion 20B in the embodiment, the present disclosure is not limited thereto. For example, a structure in which a center display mounting portion is provided separately from the support portion 20B may be adopted. Also, a structure in which the center display is embedded in the instrument panel 16 may be adopted.

Further, as shown in FIG. 4, in the third embodiment, the agent 42 is formed in a substantially spherical shape, but the present disclosure is not limited thereto. For example, an agent which imitates a mascot character may be used, or a part of the agent may be movable. Moreover, it is not necessary to provide a speaker and a microphone in the agent 42 itself. For example, a sound may be input to the agent 42 or output from the agent 42 using a speaker and a microphone provided in a vehicle cabin.

What is claimed is:

1. A steering module comprising:
a steering wheel which is provided in front of a driver seat;
a column cover which is provided on a vehicle front side of the steering wheel, extends in a forward and rearward direction of a vehicle, and has a functional component mounting region in at least one of an inner inside and an upper portion thereof;
a meter member which is formed integrally with the column cover and includes a main display portion disposed at a position spaced apart from a portion of the column cover; and
a display device is mounted in the functional component mounting region and is movable between an unfolded state in which a display surface is exposed and a stored state in which the display surface is hidden,
wherein a lower end of the main display portion of the meter member is located above an upper end of the display surface of the display device in the unfolded state of the display device.

2. The steering module according to claim 1, wherein the main display portion of the meter member is disposed on an upper side of the vehicle and a front side of the vehicle with respect to the display surface in the unfolded state of the display device.

3. The steering module according to claim 1, wherein:
the functional component mounting region is a duct which is provided inside the column cover and of which one end portion is connected to an air conditioner, and
a register to which the other end portion of the duct is connected is provided in the steering wheel.

4. The steering module according to claim 1, wherein:
the meter member includes a pair of right and left support portions which extend from both ends of the column cover in a width direction of the vehicle to a front side of the vehicle and an upper side of the vehicle, and
the main display portion connects upper end portions of the support portions to each other in the width direction of the vehicle.

5. The steering module according to claim 4, wherein:
a center display mounting portion on which a center display is mounted extends from one of the support portions in the width direction of the vehicle, and
the center display mounting portion is formed integrally with the one of the support portions.

6. A steering module comprising:
a steering wheel which is provided in front of a driver seat;
a column cover which is provided on a vehicle front side of the steering wheel, extends in a forward and rearward direction of a vehicle, and has a functional component mounting region in at least one of an inner inside and an upper portion thereof, the column cover has a shape in which the vehicle front side is wider than a vehicle rear side, the column cover includes a duct extending inside the column cover in the forward and rearward directions of the vehicle;
a meter member which is formed integrally with the column cover and includes a main display portion disposed at a position spaced apart from a portion of the column cover;
a display device which is movable between an unfolded state in which a display surface is exposed and a stored state in which the display surface is hidden is mounted in the functional component mounting region, and
the main display portion of the meter member is disposed on an upper side of the vehicle and a front side of the vehicle with respect to the display surface in the unfolded state of the display device.

7. The steering module according to claim 6, wherein:
a register is provided in the steering wheel and connected to an end portion of the duct.

8. The steering module according to claim 6, wherein:
the meter member includes a pair of right and left support portions which extend from both ends of the column cover in a width direction of the vehicle to the front side of the vehicle and the upper side of the vehicle, and
the main display portion connects upper end portions of the support portions to each other in the width direction of the vehicle.

9. The steering module according to claim 8, wherein:
a center display mounting portion on which a center display is mounted extends from one of the support portions in the width direction of the vehicle, and
the center display mounting portion is formed integrally with the one of the support portions.

10. The steering module according to claim 6, wherein the functional component mounting region and the duct are provided inside the column cover and of which one end portion of the duct is connected to an air conditioner.

11. The steering module according to claim 6,
wherein a lower end of the main display portion of the meter member is located above an upper end of the display surface of the display device in the unfolded state of the display device.

12. A steering module comprising:

a steering wheel which is provided in front of a driver seat;

a column cover which is provided on a vehicle front side of the steering wheel, extends in a forward and rearward direction of a vehicle, and has a functional component mounting region in at least one of an inner inside and an upper portion thereof;

a meter member which is formed integrally with the column cover and includes a main display portion disposed at a position spaced apart from a portion of the column cover, the meter member includes a pair of right and left support portions, at least one of the support portions extends from a width end surface of the main display portion to a rear end of the column cover;

a display device which is movable between an unfolded state in which a display surface is exposed and a stored state in which the display surface is hidden is mounted in the functional component mounting region, and the main display portion of the meter member is disposed on an upper side of the vehicle and a front side of the vehicle with respect to the display surface in the unfolded state of the display device.

13. The steering module according to claim 12, wherein:

the functional component mounting region includes a duct which is provided inside the column cover and of which one end portion is connected to an air conditioner, and a register to which the other end portion of the duct is connected is provided in the steering wheel.

14. The steering module according to claim 12, wherein:

the pair of right and left support portions extend from both ends of the column cover in the width direction of the vehicle to the front side of the vehicle and the upper side of the vehicle, and the main display portion connects upper end portions of the support portions to each other in the width direction of the vehicle.

15. The steering module according to claim 14, wherein:

a center display mounting portion on which a center display is mounted extends from one of the support portions in the width direction of the vehicle, and the center display mounting portion is formed integrally with the one of the support portions.

16. The steering module according to claim 14,
wherein a lower end of the main display portion of the meter member is located above an upper end of the display surface of the display device in the unfolded state of the display device.

17. The steering module according to claim 12, wherein at least one of the support portions includes a longitudinal part extending from an end portion of the column cover in a width direction of the vehicle to an end of the main display portion in the width direction of the vehicle.

* * * * *